US006840703B2

(12) United States Patent
Blanchard (10) Patent No.: US 6,840,703 B2
(45) Date of Patent: Jan. 11, 2005

(54) ASSEMBLY SYSTEM BASED ON A BALL ANCHORING DEVICE

(75) Inventor: Jean-Marie Blanchard, Nogent sur Vernisson (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 10/003,248

(22) Filed: Dec. 6, 2001

(65) Prior Publication Data

US 2002/0067045 A1 Jun. 6, 2002

(30) Foreign Application Priority Data

Dec. 6, 2000 (FR) .............................................. 00 15787

(51) Int. Cl.$^7$ .............................. B60N 2/15; F16B 21/16
(52) U.S. Cl. .............. 403/322.2; 403/325; 403/DIG. 6; 403/322.1; 403/388; 248/429; 296/65.03; 297/344.11
(58) Field of Search ............................... 403/322.2, 325, 403/DIG. 6, 322.1, 387, 388; 431/348; 297/344.11, 378.13, 378.14; 248/429, 430; 296/65.09, 65.03, 65.05, 69

(56) References Cited

U.S. PATENT DOCUMENTS

| | | | | |
|---|---|---|---|---|
| 2,373,083 A | * | 4/1945 | Brewster | 411/348 |
| 2,402,925 A | * | 6/1946 | Spooner | 411/348 |
| 2,901,804 A | * | 9/1959 | Williams | 411/348 |
| 3,037,256 A | * | 6/1962 | Chapman | 411/348 |
| 3,085,462 A | * | 4/1963 | Myers | 411/348 |
| 3,233,496 A | | 2/1966 | De Pew et al. | |
| 3,980,327 A | * | 9/1976 | Duran | 24/607 |
| 4,111,477 A | * | 9/1978 | Rigali | 292/252 |
| 4,402,469 A | * | 9/1983 | Stiner | 242/84.5 |
| 4,616,952 A | * | 10/1986 | Schott | 403/325 |
| 4,906,123 A | * | 3/1990 | Weskamp et al. | 403/322.2 |
| 4,957,387 A | * | 9/1990 | Nasu | 403/322.2 |
| 4,960,344 A | * | 10/1990 | Geisthoff et al. | 403/322.2 |
| 5,141,355 A | * | 8/1992 | Stillwagon | 403/322.2 |
| 5,207,544 A | * | 5/1993 | Yamamoto et al. | 292/252 |
| 5,458,431 A | * | 10/1995 | Ferreol-Ragotin | 403/322.2 |
| 5,496,080 A | * | 3/1996 | Chabanne et al. | 403/322.2 |
| 5,620,225 A | * | 4/1997 | Harry | 296/63 |
| 5,988,364 A | | 11/1999 | Boyce et al. | |
| 6,129,324 A | * | 10/2000 | Blanchard | 403/322.2 |

FOREIGN PATENT DOCUMENTS

| | | | | |
|---|---|---|---|---|
| EP | 750087 A1 | * | 12/1996 | ........... E05B/63/12 |
| FR | 2 735 174 | | 12/1996 | |
| FR | 2771439 A1 | * | 5/1999 | ........... E05B/63/12 |
| GB | 971537 A | | 9/1964 | |

OTHER PUBLICATIONS

International Search Report dated Aug. 23, 2001; No. FA 595830—FR 0015787; pps. 1–2.

\* cited by examiner

*Primary Examiner*—Robert J. Sandy
*Assistant Examiner*—Ernesto Garcia
(74) *Attorney, Agent, or Firm*—Connolly Bove Lodge & Hutz LLP (57) ABSTRACT

The ball anchoring device consists of a lock body (10) comprising an annular wall (14) featuring radial holes (15) to accommodate radially mobile balls (16), and a locking piston (20) that slides axially within the body bore between a released position and a locked position.

The lock body (10) is inserted into a first hole (7) made in the surface of the first part (55) and into a second hole (8) made in the surface of the second part, the two holes being more or less coaxial. It features a flange (12) bearing against the first part around the first hole through a spring thrust element (18), and with the piston in the locked position, the balls (16) are maintained partly protruding under the free face (82) of the second part, on the one hand in angular contact with the edge (81) of the second hole (8), and on the other hand bearing against a lateral retention surface (23) of the piston head (22), under the effect of the axial thrust applied to the balls by the body through the load applied to the flange (12) by the spring thrust element (18).

11 Claims, 5 Drawing Sheets

ASSEMBLY SYSTEM BASED ON A BALL ANCHORING DEVICE

FIELD OF THE INVENTION

This invention concerns an attaching system of the ball lock type, which can be used more particularly, but not exclusively, to attach an automobile vehicle seat supporting structure to the floor of the said vehicle.

BACKGROUND OF THE INVENTION

To make such an attachment, for example to secure to the floor a rail element for longitudinal seat position adjustment, a means of attachment by screwing is commonly used, either by screwing a bolt into a nut joined to the floor, or screwing a nut onto a threaded stud joined to the said floor. Consequently, it is obligatory to perform a screwing operation when putting the seat in place in the vehicle, which is not always practical if the bolt heads or nuts are poorly accessible to conventional screwing tools.

In other cases, particularly when the connection of the seat to the floor must be readily separable, for example in the case of the rear attachments of seats with tilting seat pans, or with completely removable seats, it is known to make this attachment using different lockable anchoring systems, including hook systems or ball anchoring systems, which can be released relatively easily if necessary.

Generally speaking these systems are designed so that locking takes place automatically when the seat is brought into its utilization position. Unlocking is ensured by a control component such as a handle which can be pulled or turned to unlock the anchoring system. In many anchoring mechanisms, unlocking results in a more or less linear displacement of an actuator which releases the anchoring means, balls or hooks, allowing them to move in such a way that the anchoring component attached to the seat disengages from the anchoring component attached to the floor of the vehicle.

This actuator has two positions:
  a locked position, which can only be obtained when the seat is anchored to the floor,
  a released position, which is maintained as long as the seat is not anchored to the floor.

The change from the released position to the locked position generally takes place automatically only when the seat is brought into the desired anchoring position on the floor. The change from the locked position to the released position requires intentional action by the user on the control component.

For information, the known ball anchoring systems generally comprise a tubular body with several radial holes in cut in the tube wall. A ball of diameter exceeding the wall thickness is placed in each hole. The actuator is a pin that slides within the tube and has a tapered section, level with the holes in the body, which pushes the balls outwards further to an axial movement of the pin. In the locked position, the tubular body attached to the seat is inserted into a hole of the corresponding diameter in the floor, and the pin is pushed downwards by a spring such that its tapered section forces the balls outwards causing them to protrude beyond the exterior of the tube, below the edge of the hole in the floor, thereby preventing withdrawal of the tubular body. To release the anchoring system, the pin must be pulled up against the force of the spring, by various control means, thus enabling the balls to move radially inwards into a retracted position with respect to the outer surface of the tubular body. The balls are held in this position by an outer sliding ring which covers them when the anchoring system is withdrawn from the hole in the floor. This means that the pin cannot return to its locking position as long as the said ring has not been pushed back by the floor when the tubular body is inserted into the hole in the floor, when the seat is put back into its utilization position. The position of the pin thus indicates whether the seat is locked or not. Further information on ball locking systems can be found for example in documents FR-2728317, FR-2735174, FR-2699973, FR-2771439.

As can be seen, such ball anchoring systems are relatively complex, requiring several components not only to ensure the actual locking action, but also to control release on demand and automatic relocking. They require the use of high-precision components to ensure reliability, therefore they are costly.

Other anchoring systems ensuring reliable but readily separable attachment of a seat to the floor are already known, such as known types of hook or cam anchoring systems, but they also feature numerous components, some of which are mobile or hinged with respect to the others to ensure the required functions of reliable locking and easy unlocking.

The use of these systems can therefore be justified for removable or at least tilting seats, where the attaching system must be readily released in order to maneuver the seat. But these systems are too sophisticated and therefore too costly for seats which are not intended to be removed or separated from the floor other than for exceptional maintenance operations.

BRIEF DESCRIPTION OF THE INVENTION

The present invention therefore aims at providing an attachment system that is simpler and less costly than the separable anchoring systems described above, but which is rapid and easy to implement and can be readily automated, without presenting, for example, the above mentioned disadvantages of screwing attachment systems. It aims in particular at proposing an attachment system that can be installed by a robot, with few components and therefore reduced manufacturing cost. It also aims at avoiding the need for a high degree of precision in the production of the parts and the relative position of the seat and the means of attachment with respect to the floor, to readily accept the inevitable scatter in dimensions between the different attachment points of a given seat. It further aims at providing an attachment system which, although it is generally permanent and definitive, can nevertheless be dismounted using specific but simple tools, in the repair shop for example.

With these objectives in view, the subject matter of the invention is a system for assembling a first part to a second part by means of a ball-anchoring device comprising a basically cylindrical lock body with a central bore and an annular wall featuring radial holes to accommodate radially mobile balls, and a locking piston that slides axially within the body bore between a released position and a locked position where the piston head keeps the balls pressed outwards and protruding beyond the outer wall of the body, the two parts featuring surfaces that are applied against each other.

In accordance with the invention, the assembly system is characterized in that the lock body is inserted into a first hole made in the surface of the first part and into a second hole made in the surface of the second part, the two holes being more or less coaxial, the lock body features a flange bearing against the free face of the first part around the first hole through a spring thrust element, and the balls are maintained partly protruding under the free face of the second part, on the one hand in angular contact with the edge of the second hole opening into the said free face of the second part, and on the other hand bearing against a lateral retaining surface of the piston head, the said lateral surface displaying in the area of contact of each ball a gradient or slope such that, under the effect of the axial thrust applied to the balls by the body through the load applied to the flange by the spring thrust element, the contact of each ball on the said lateral surface maintains the piston in the locked position.

The assembly thus consists of a ball locking device but which does not feature the means habitually used in the known ball anchoring systems such as the thrust spring acting on the pin to ensure automatic locking, or the control components associated with the said pin to provide for ready release. However, in a manner that greatly simplifies the device, it is the combination of ball retention by the piston head and the pushing of the body against the balls under the action of the spring thrust element that causes locking by "jamming" the balls against the edge of the hole in the second part. The description that follows will provide a clearer understanding of how the system functions, but its simplicity can already be noted. Apart from the lock body, the balls and the piston, it comprises just the spring thrust element and a snap ring serving both for the temporary holding of the balls and retention of the spring thrust element, as will be seen further on. Apart from the cutting of the holes in the two parts to be assembled, there is no need for other accessories or preparatory operations on the parts to be assembled. The manufacture of the lock body and the piston requires no precision machining operations, and more specifically no crimping operations on the body to prevent the balls escaping from their recesses.

Preferably, the spring thrust element is a tapered washer encircling the body, with its characteristics being determined so as to ensure the required clamping force, while accepting an additional elastic deformation during fitting and which can also compensate for any deformation or wear likely to occur in use, for example by peening of the surfaces of the parts in contact with the balls.

Also preferably, the gradient of the piston head lateral retention surface is obtained by making the said lateral surface in the form of a truncated cone with the larger diameter situated beyond the balls when the piston is in the locked position. Thanks to this arrangement, the piston is automatically maintained in the locked position when brought there by the thrust exerted by the balls on the said tapered surface.

To keep the balls retracted in the holes in the body before it is inserted into the holes in the parts to be assembled and with the piston in the released position, a snap ring is placed around the body, the said snap ring being automatically pushed back axially when the body is inserted into the holes, of which at least one, and more specifically the hole in the second part, is of smaller diameter than the outside diameter of the snap ring.

In accordance with a particular method of producing the invention, in which the attaching device is premounted on the first part of the assembly, the body is attached to the first part by one or more lugs joined to the first part and holding the flange and the spring thrust element gripped between the said lug(s) and the surface of the first part.

In accordance with yet another arrangement:
the piston features a rod whose opposing end to the piston head protrudes beyond the body and features a means of gripping on which a release tool can be fitted to move the piston from the locked position. The assembly can thus be dismounted for maintenance operations and its various components can be recovered for reuse after reconditioning, as will also be explained further on.

The subject matter of the invention is also a ball-locking type attaching device comprising:
a basically cylindrical lock body with a central bore and an annular wall featuring radial holes to accommodate radially mobile balls, and a locking piston that slides axially within the body bore between a released position and a locked position.
a snap ring that encircles the body around the holes to temporarily prevent outward radial movement of the balls, and which can be moved axially along the body to free the said balls,
this device being characterized in that, in order to be used for an assembly system such as that defined above:
the lock body features a flange under which a spring thrust element is retained axially by the said snap ring,
the piston has a head suitably shaped:
firstly, to contain the balls from the interior of the body when it is in the released position, in which case the balls are retained from the exterior by the snap ring, and
secondly, by intentionally provoked sliding of the piston towards the locked position, to push the balls outwards once they have been released due to the sliding of the retaining snap ring along the body to a locked position where the said balls protrude with respect to the outer surface of the body and to maintain the balls in the said locked position,
the piston head also features a lateral retention surface which cooperates with the balls and displays a gradient in the contact zone of each ball such that, when the balls are kept pushed outwards in the locked position by the piston, they act on the said retention means to prevent free movement of the piston towards the released position.

In accordance with a particular arrangement, the piston head has means for maintaining the piston in the released position as long as the balls are retained by the snap ring. Preferably, the tip of the piston head beyond the lateral retention surface has a recess that accommodates the balls when they are held in the retracted position by the snap ring, the said recess featuring a far edge that flares outwards towards the periphery and, by axially abutting on the said balls in the retracted position, prevents the piston from coming out of the body. This arrangement ensures that the attaching device components are held together before the device is installed, by preventing accidental withdrawal of the piston from the body.

The subject matter of the invention further concerns a process for making an assembly system such as that defined above, characterized in that an attaching device, such as that also defined above, is offered up opposite holes in the walls of the parts to be assembled, with the piston in the released position and the snap ring covering the balls, and an axial thrust force is applied to the protruding end of the piston in order to insert the body of the device into the holes until the balls are located partly under the free surface of the second part, with the snap ring being retained by one of these walls, the thrust force is maintained to compress the spring thrust element between the flange and the wall of the first part, and then to move the piston fully home to the locked position.

Preferably, the thrust force is obtained by an impact, for example applied with a hammer with the striking force applied to the protruding end of the piston rod. Even more preferably, a special installation tool that can be fitted on to the lock body will be used, thereby avoiding striking the end of the piston rod directly. The impact force may for example be provided by a pneumatic striking tool.

Other characteristics and advantages will come to light in the following description of an example of production of an attaching device in conformity with the invention, and how it is used to attach an automobile vehicle seat mounting rail to the floor of the said vehicle.

BRIEF DESCRIPTION OF THE FIGS

Refer to the appended drawings in which:

FIG. 6 illustrates the removal of the attaching device, FIG. 7 provides a similar view to FIG. 2, in another embodiment, where the device is premounted on the first part to be assembled.

BRIEF DESCRIPTION OF THE INVENTION

Figure 1:
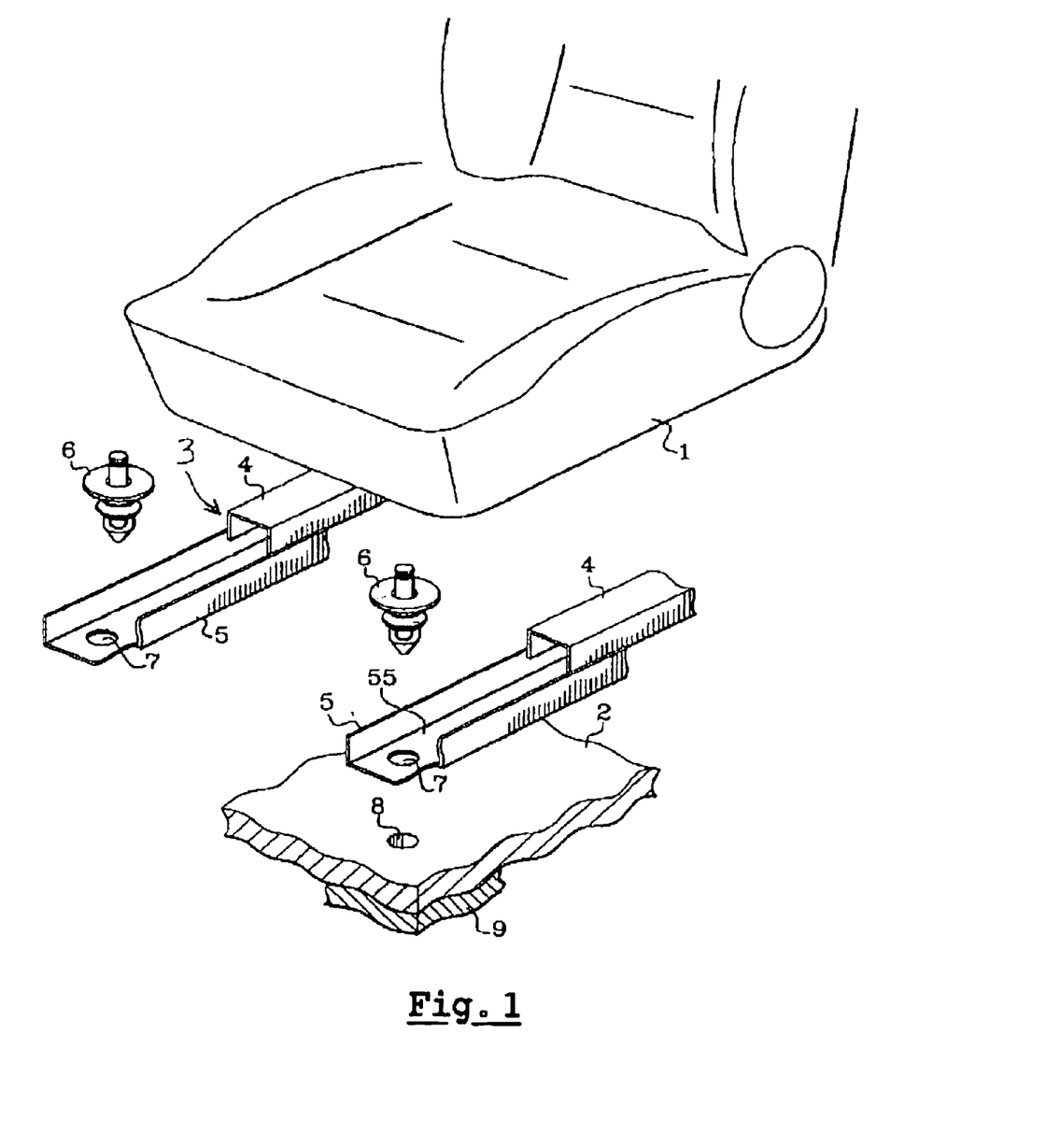
FIG. 1 is a partial perspective and exploded view of the seat and the elements for assembling it to the floor.

The drawing in FIG. 1 shows a vehicle seat 1 that is to be mounted on the floor 2 of the said vehicle by means of a set of rails 3 allowing longitudinal adjustment of the seat position. In a way known in itself, the frame of the seat pan is fixed to the upper rail elements 4, and the seat is usually supplied with its set of rails ready to be mounted on the floor 2. The lower rail elements 5 are U-channel sections secured to the floor by ball locking devices in accordance with the invention, which enter holes 7 in a surface 55 forming the bottom of the rail lower elements, and holes 8 made in the floor and in a reinforcement 9 welded to the underside of the floor below these holes.

Figure 2:
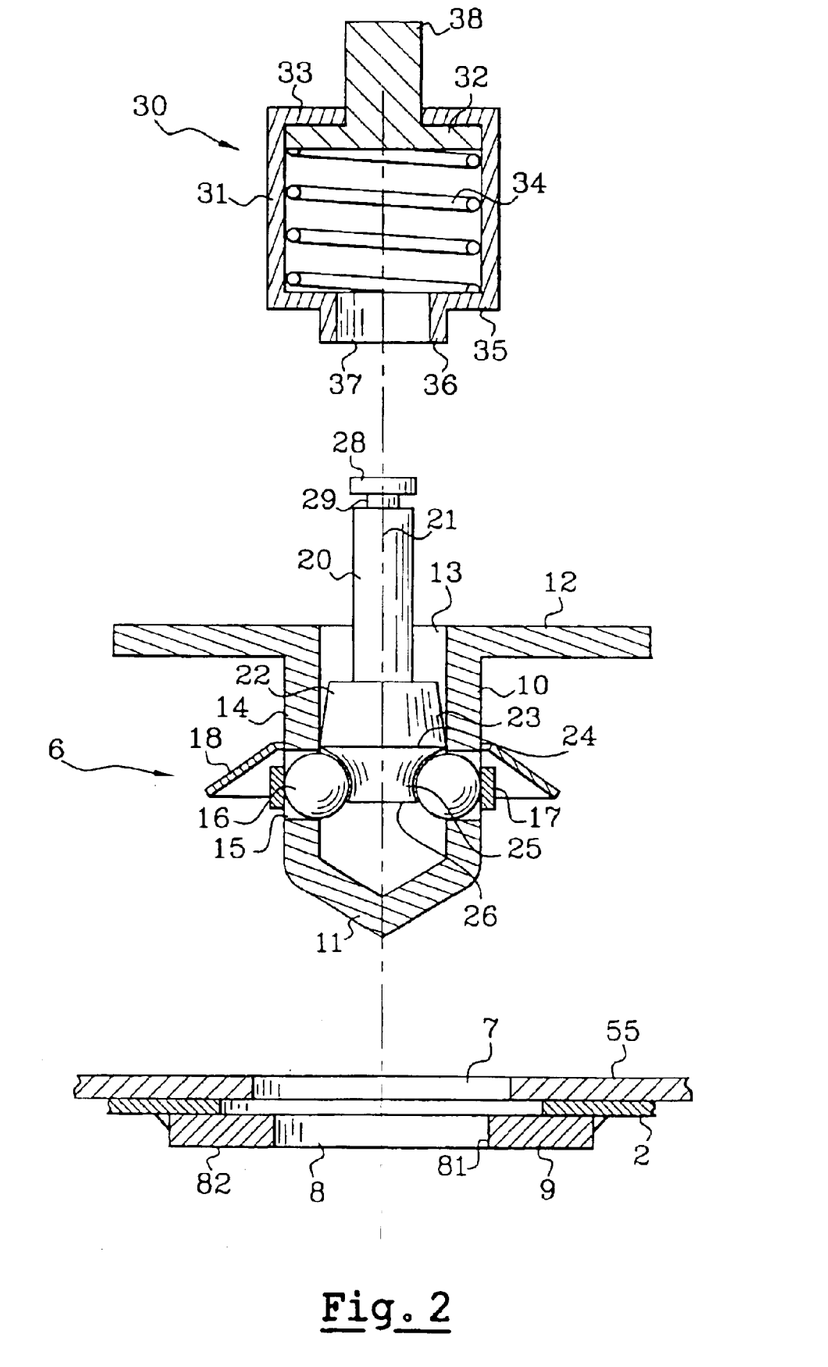
FIG. 2 is a cross-sectional view of the attaching device before installation, offered up above the parts to be assembled, along with the installation tool.

The drawing in FIG. 2 shows the attaching device 6 before it is installed, positioned coaxially with holes 7 and 8 made respectively in the bottom 55 of rail 5, and in the floor, or more precisely the floor reinforcement 9, the bottom surface 55 of rail 5 resting on the floor 2 to which it must be secured.

The attaching device 6 comprises a basically cylindrical body 10 whose lower end forms a cone-point 11 that facilitates entry of the body into holes 7 and 8 during installation. The upper end of the body features a flange 12. A bore 13 is made coaxially in the body, defining an annular wall 14 in which several holes 15, for example three holes, are drilled radially, to accommodate the balls 16 which can thus move radially in the said holes. The diameter of the balls is substantially greater than the thickness of the wall 14, for example a diameter of 3 mm for a wall thickness of 1.5 to 2 mm, with the body having an outside diameter of 12 mm. These values are of course given purely by way of example and are in no way limiting.

A piston 20 is inserted into the bore 13 of the body. It features a rod 21 that protrudes from the top end of the body and a head 22 whose larger diameter is roughly equal to that of the cylindrical bore 13. The piston head 22 has an upper tapered section 23, whose smaller diameter face meets the rod 21, and has its larger diameter base 24 on the side away from the rod, that is to say towards the bottom as illustrated on the drawings. On the other side of the tapered section 23 with respect to the larger diameter zone 24, the piston head features a toroidal zone 25 at a lower end section whose surface forms a portion of a torus such that when viewed in cross-section, it forms an arc of a circle with a radius roughly equal to that of the balls. This lower end section moreover forms an end shoulder 26 with a larger diameter than that of the most recessed part of the toroidal zone 25.

Before the ball anchoring device is installed, the balls are maintained in their respective recesses and prevented from protruding beyond the outer surface of the body by a snap ring 17 that encircles the body around the holes 15. The piston 20 is maintained in the released position illustrated in FIG. 2 by the engagement of the balls 16 which are forced towards the interior of the bore, against the toroidal zone 25 of the piston head. The end shoulder 26 of the piston head prevents the piston from escaping from the body, as the said shoulder abuts against the balls. The snap ring 17 also ensures axial retention of a tapered spring washer 18 encircling the body below the flange 12.

The snap ring is made, for example, from a steel sleeve that is split to give it sufficient springiness to maintain the balls but also to allow it to slide along the body without requiring the application of excessive force, as will be understood later on.

The installation tool 30 typically consists of a tool body 31 in which is placed a sliding anvil 32 that is held pressed against an upper surface 33 by a spring 34. A lower surface 35 of the tool body features a centering bush 36 of appropriate size to center itself in the top end of the bore 13, the centered bush forming an opening 37 in which the piston rod 27 can penetrate until its top end 28 is situated beneath the anvil 32. In addition, the anvil includes a striking head 38 which protrudes above the tool body, designed to be struck by a hammer or a pneumatic striking tool, not illustrated.

Figure 3:
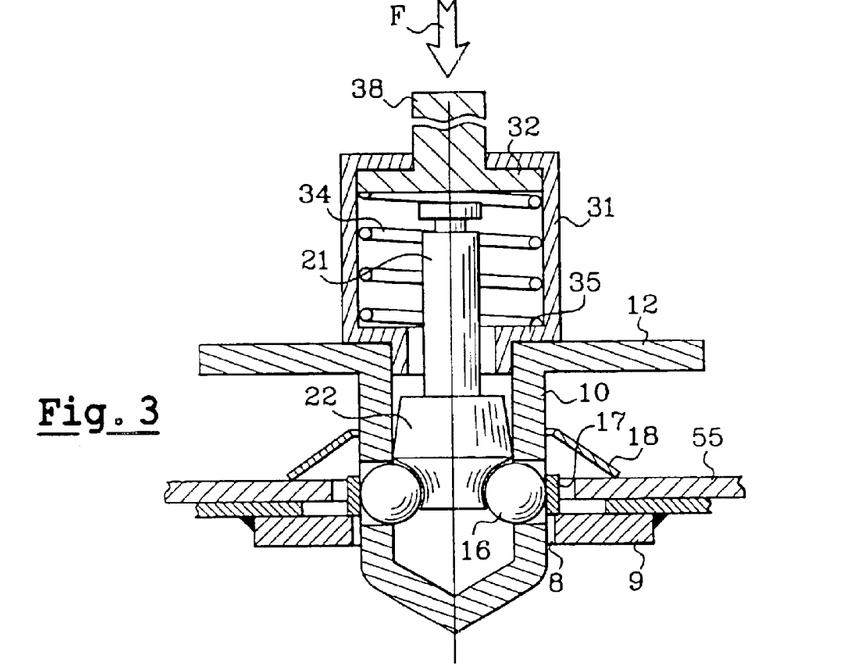
FIGS. 3 to 5 illustrate the subsequent phases in the making of the assembly.

To make the assembly, the lower end 11 of the body is inserted into holes 7 and 8 down to an intermediate position shown in FIG. 3 where the device rests on the floor through the contact of the snap ring 17 against the floor reinforcement 9 around the periphery of hole 8. The tapered washer 18 then rests on the bottom surface 55 of rail 5.

It will be noted that diameter of the hole 7 in the rail is significantly larger than the outside diameter of the body and in particular larger than the outside diameter of the snap ring 17, so that the snap ring can bear against the floor reinforcement 9 by passing through the hole 7 in the rail. Conversely, the hole 8 in the said floor reinforcement 9 is of virtually the same diameter, allowing for functional clearance, as the body of lock 10, and therefore in particular smaller than the outside diameter of the snap ring 17, so that the snap ring is automatically pushed back towards the flange when the body is inserted deeper into the said hole 8.

The hole 7 in the rail, however, can be substantially larger than the cross-section of the body, to allow offsetting of the centerlines of holes 7 and 8, in order to compensate for any dimensional differences between the positions of the holes in the rails and the holes in the floor. The hole in the rail must nevertheless remain sufficiently smaller than the outside diameter of the tapered washer 18 to ensure contact between the washer and the surface of the rail around the entire periphery of hole 7.

When the attaching device is positioned as shown in FIG. 3, the tool 30 is then positioned on the body of the attaching device.

Under the effect of a thrusting force or impact applied to the anvil 32, symbolized by arrow F, and owing to the relatively low sliding resistance of snap ring 17 on the body 10 with respect to the rigidity of the spring 34 of tool 30, the lower surface 35 of the tool pushes the flange 12 downwards, making the body 10 penetrate deeper into the holes 7 and 8, moving the snap ring 17 towards the flange and thereby uncovering the holes 15 in which balls are housed.

It will be noted that, insofar as the balls never descend completely beneath the unobstructed lower surface 82 of the reinforcement 9, they can never escape from the body as they are always retained by the wall of the hole 8.

Figure 4:
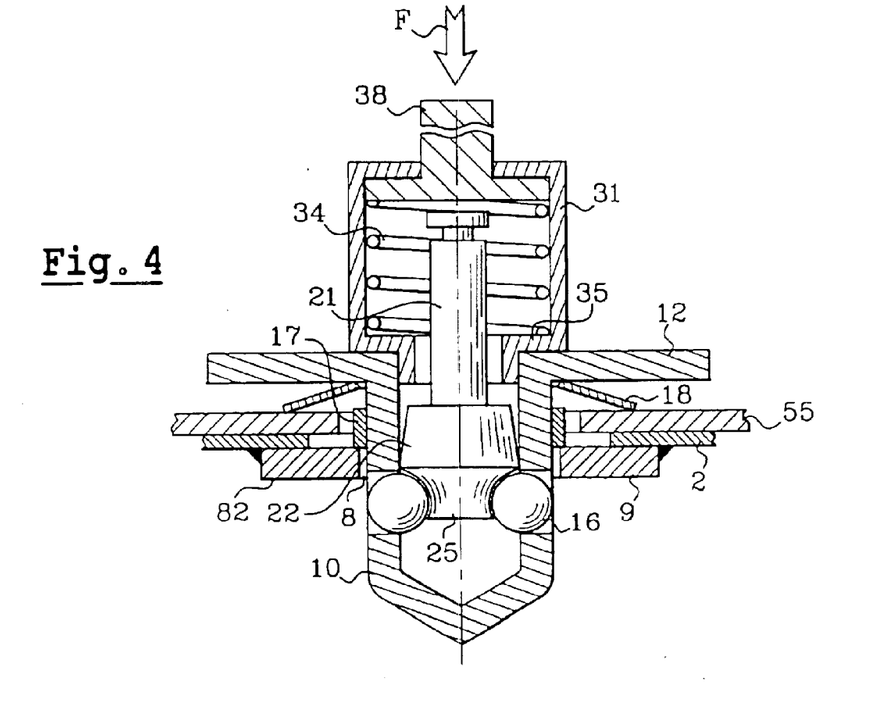

The movement of the body 10 thus continues until the flange 12 abuts against the tapered washer 18, as shown in FIG. 4, and starts to compress it. The thrust or dynamic effect of the impact applied to the anvil continues, but the compression force of the washer reaches such a level that it counters the movement of the body of the device and therefore also of the body 31 of tool 30, with the result that the anvil 32 continues its movement by sliding within the body of the tool, thereby compressing the spring 34.

Figure 5:
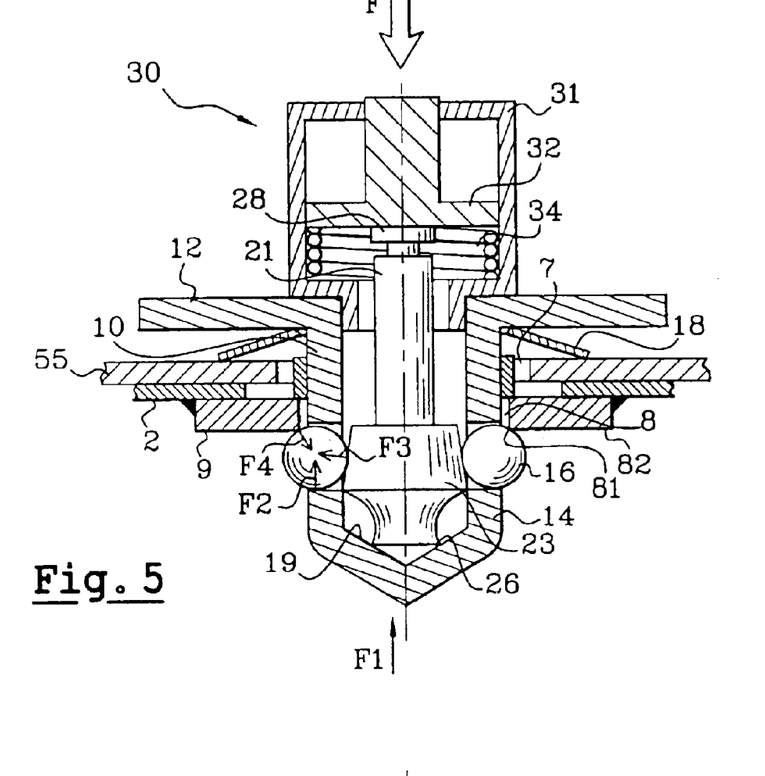

The anvil then comes into contact with the upper end 28 of the piston rod 21 and pushes the piston downwards, making the balls 16 protrude beyond the outer surface of the body 10 until they come into contact with the edge 81 of the hole level with the lower surface 82 of the floor reinforcement 9, as illustrated in FIG. 5. At end of travel, the piston reaches the bottom of the bore 13 in body 10, and the end shoulder 26 abuts against the bottom 19 of the bore and the tapered section 23 of the piston head 22 is level with the balls 16. Locking is then ensured and the tool 30 can be removed, the attaching device remaining in the position shown in FIGS. 5 and 6.

It will be noted that in this position the stability of the system is ensured by the spring return force F1 exerted by the tapered washer 18 on the body 10 by pressing against the bottom 55 of the rail and tending to push the said body upwards. This thrust force is transferred and distributed to the balls through their recesses in the direction of arrows F2, and by the contact of the balls with the tapered section 23 of the piston head in the direction of arrow F3. The force thus exerted on each ball is balanced by the bearing pressure F4 of the ball on the edge 81 of hole 8, which is oblique due to the position of the ball which protrudes slightly above the plane of the lower surface 82 of the floor reinforcement 9, as is shown clearly in FIGS. 5 and 6.

Figure 6:
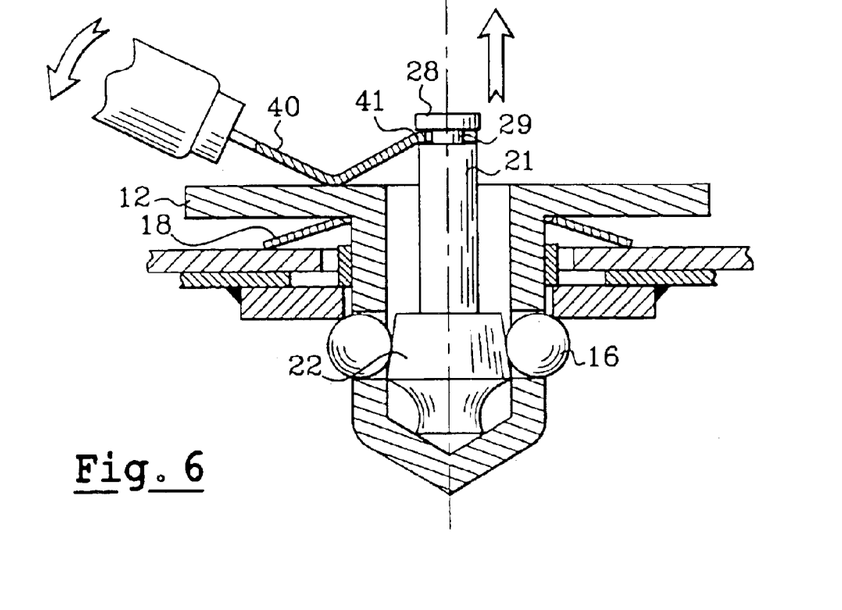

It will also be noted that the direction of reaction force of the balls on the tapered section 23 is angled downwards due to the said tapering. The result of this is that the piston is held firmly in the locked position, in contact with the bottom of the bore, through the pressure resulting from the angle of the bearing pressures F4 of the balls on the edge of hole 8, applied to the tapered section 23 by the balls 16.

However, in order to be able to dismount the assembly and remove the attaching device, means are provided for extracting the piston, for example such as shown in FIG. 6, a circular groove 29 made near the upper end 28 of the piston rod 21, into which the fork 41 of an elbowed dismounting tool 41 can be engaged. By applying a leverage force using the said tool, resting the elbow on the upper surface of flange 12 as shown in FIG. 6, sufficient force can be applied to the rod 21 while simultaneously compressing spring washer 18 a little further to overcome the previously mentioned forces and extract the piston from the body. The balls can then retract into the body and the device can be removed. As the balls are no longer retained by snap ring 17, they can escape, and likewise the piston can be completely withdrawn from the body. It then suffices to recondition the device by putting the piston and balls back into their original position and fitting the snap ring back in place around the body and balls in the position shown in FIG. 2 to keep the assembly together.

Figure 7:
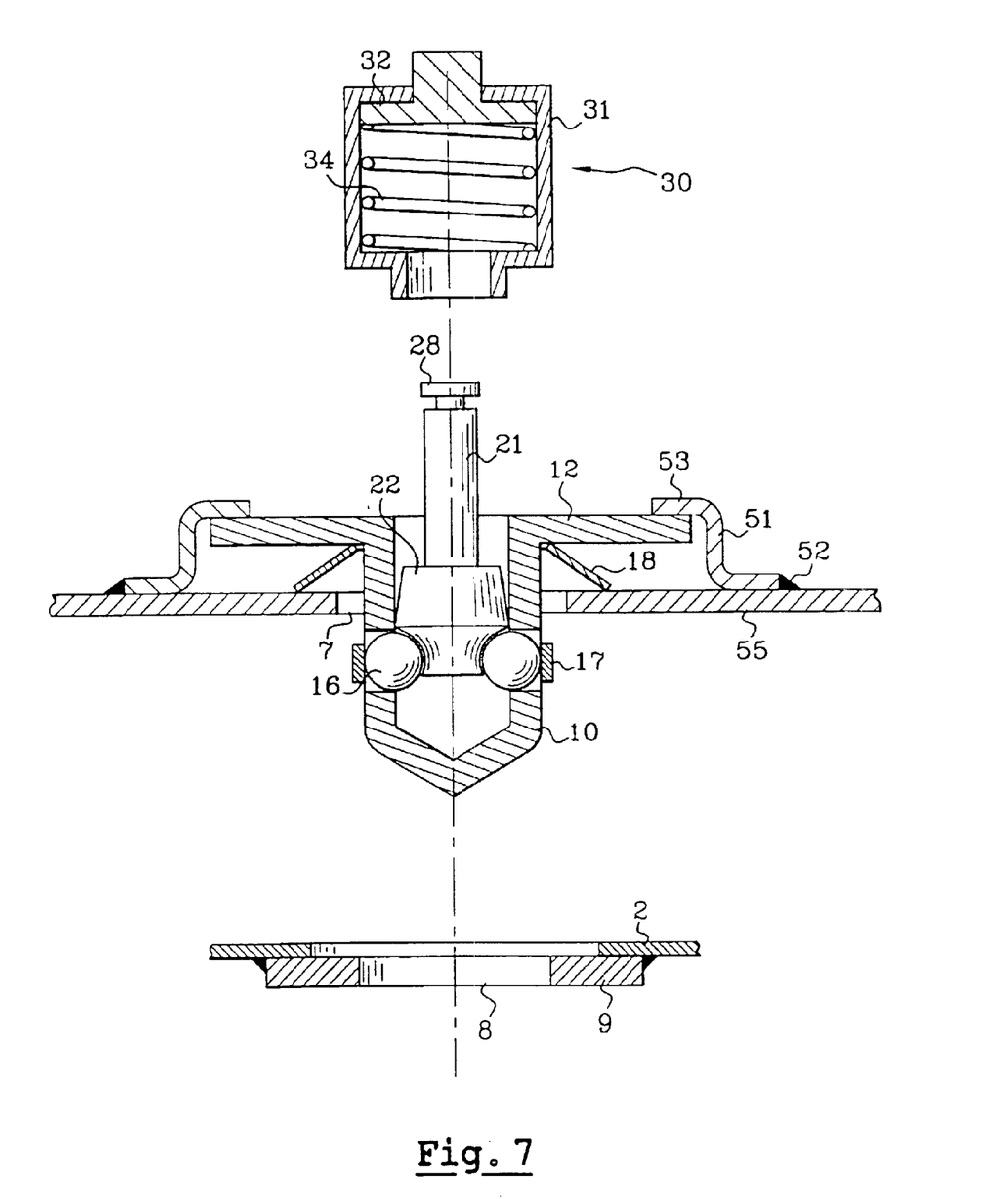

In the variant shown in figure 7, the body of the device is held on the first part made up, for example, by the rail element 5, by elbowed lugs 51 joined to the surface 55 by welds 52, with one wing 53 of the lug overlapping the top of the flange 12. The device is thus held firmly on part 5 prior to assembly, thanks to slight pro-stressing of the tapered washer, but nevertheless with the possibility of adapting its position by lateral sliding during assembly to allow the body of lock 10 to enter the hole 8 in the floor without difficulty, and to center itself automatically.

The invention is not limited to the embodiments and the applications described above solely by way of example. More specifically, the application of the assembly system is in no way limited to the described attachment of a seat to the floor of an automobile.

Furthermore, in the example described above, the space between the lock body 10 and the edge of the hole 7 is used to accommodate the snap ring 17 when it is retained by the floor reinforcement 9. In the case where the holes in the two parts to assemble could be easily aligned, or even to use the lock body as a hole centering device, the two holes could also be drilled to the same diameter, and the upper part of the body and the flange could be designed so that the snap ring 17 can abut and be retained above the surface of the first part without being detrimental to the thrust, spring return and clearance take-up function of the tapered washer, or any other component capable of fulfilling theme functions.

What is claimed is:

1. System for assembling a first part to a second part by means of a ball anchoring device featuring a basically cylindrical lock body comprising a central bore and an annular wall featuring radial holes to accommodate radially mobile balls, and a locking piston that slides axially within the central bore between a released position and a locked position where a piston head keeps the balls pressed outwards and protruding from a surface of the body, the two parts featuring surfaces that are applied against each other;

wherein the lock body is inserted into a first hole made in the surface of the first part and into a second hole made in the surface of the second part, the two holes being more or less coaxial, the lock body features a flange bearing against a spring thrust element which in turn bears against a free surface of the first part around the first hole, and the balls are maintained partly protruding under a free surface of the second part, in angular contact with the edge of the second hole into the free surface of the second part, and bearing against a lateral retaining surface of the piston head, the lateral retaining surface displaying in an area of contact of each ball a gradient such that under the effect of an axial thrust applied to the balls by the body through the load applied to the flange by the spring thrust element, the contact of each ball on the lateral retaining surface of the piston maintains the piston in the locked position;

wherein the system includes a snap ring that encircles the body, said snap ring being designed to maintain the balls in a retracted position in the holes in the body before the body is inserted into the holes in the parts to assemble and when the piston is in the released position, and where the diameter of at least one of the holes in the parts is smaller than the outside diameter of the snap ring.

2. System for assembling a first part to a second part by means of a ball anchoring device featuring a basically cylindrical lock body comprising a central bore and an annular wall featuring radial holes to accommodate radially mobile balls, and a locking piston that slides axially within the body bore between a released position and a locked position where a piston head keeps the balls pressed outwards and protruding from a surface of the body, the two parts featuring surfaces that are applied against each other;

wherein the lock body is inserted into a first hole made in the surface of the first part and into a second hole made in the surface of the second part, the two holes being more or less coaxial, the lock body features a flange bearing against a spring thrust element which in turn bears against a free surface of the first part around the first hole, and the balls are maintained partly protruding under a free surface of the second part, in angular contact with the edge of the second hole opening into the free surface of the second part, and bearing against a lateral retaining surface of the piston head, the lateral retaining surface displaying in an area of contact of each ball a gradient such that under the effect of an axial thrust applied to the balls by the body through the load applied to the flange by the spring thrust element, the contact of each ball on the lateral retaining surface of the piston maintains the piston in the locked position; and further wherein the body is joined to the first part by one or more lugs attached to the first part and holding the flange, and the spring thrust element gripped between one or more logs and the surface of the first part.

3. Assembly system in accordance with claim 1, wherein a tip of the piston head beyond the lateral retaining surface has a toroidal zone recess that accommodates the balls when the balls are held in the retracted position by the snap ring, the recess featuring a far edge that turns outwards towards a periphery and, by axially abutting on the balls in the retracted position, prevents the piston from coming out of the body.

4. A ball anchoring device for fastening first and second parts together, the device comprising:

a generally cylindrical lock body having a central bore bounded by an annular wall;

radial holes formed in the annular wall to receive radially movable balls;

a locking piston that slides axially within the bore between a released position and locked position;

the piston having a head for contacting the balls and urging them radially outwards for protrusion from the surface of the body;

a first hole formed in the first part positioned in coaxial relationship with a second hole formed in the second part;

the lock body being received in the first and second holes;

an axially movable string thrust element extending outwardly from the lock body and bearing against the periphery of the first hole;

a flange extending outwardly from the lock body and bearing against the spring thrust element;

balls partly protruding radially outwards from the lock body, under a surface of the second part, in contact with an edge of the hole in the second part, and bearing radially inwards against a tapered lateral retaining surface of the piston head, thereby maintaining the piston in a locked position; and a snap ring encircling the lock body and retaining the balls in a retracted position within the holes of the lock body prior to fastening the first and second parts together, when the piston is in a released position, and wherein the diameter of at least one of the holes of the first or second part is smaller than an outer diameter of the snap ring.

5. A ball anchoring device for fastening first and second parts together, the device comprising:

a generally cylindrical lock body having a central bore bounded by an annular wall;

radial holes formed in the annular wall to receive radially movable balls;

a locking piston that slides axially within the bore between a released position and a locked position;

the piston having a head for contacting the balls and urging them radially outwards for protrusion from the surface of the body;

a first hole formed in the first part positioned in coaxial relationship with a second hole formed in the second part;

the lock body being received in the first and second holes;

an axially movable spring thrust element extending outwardly from the lock body and bearing against the periphery of the first hole;

a flange extending outwardly from the lock body and bearing against the spring thrust element;

balls partly protruding radially outwards from the lock body, under a surface of the second part, in contact with an edge of the hole in the second part, and bearing radially inwards against a tapered lateral retaining surface of the piston head, thereby maintaining the piston in a locked position; and at least one lug secured at a first end thereof to the first part, a second end of the lug bearing against the flange for maintaining the spring thrust element between the flange and the first part.

6. The device set forth in claim 4, wherein an inward end section of the piston head has a circular recess for contacting the balls when the balls are held in the retracted position by the snap ring, the recess having an inward end that is flared outwardly toward the wall of the lock body, the recess receiving the balls when retracted to cause an interference fit with the holes that prevents the piston from being extracted from the lock body.

7. A ball anchoring device for fastening first and second parts together, the device comprising:

a generally cylindrical lock body having a central bore bounded by an annular wall;

radial holes formed in the annular wall to receive radially movable balls;

a locking piston that slides axially within the bore between a released position and a locked position;

a slidable snap ring encircling the lock body radially outwardly of the holes for containing the balls in the body, sliding displacement of the snap ring permitting displacement of the balls to protrude radially outwardly from the holes;

the piston having a head that includes:

a) a contour for receiving the balls when the lock body is in a released condition; and b) a tapered surface for urging the balls outwards to a locked position when the piston is pushed into the body thereby preventing free movement of the piston towards the released position.

8. The device set forth in claim 7, wherein the balls are contained by the snap ring while the piston maintains a released position.

9. The device set forth in claim 8, wherein the piston head contour is formed in a cylindrical surface of the piston head.

10. The device set forth in claim 7, wherein the tapered surface of the piston head has an edge of maximum diameter that is located beyond the position of the balls when the piston is in the locked position.

11. The device set forth in claim 4, together with a tool that is positioned over the piston and in contact with the flange, displacement of the tool applying a thrust force to the piston causing the snap ring to move on the body, and causing the body to be inserted in the first and second holes until the balls are situated partly below the second part, the thrust force being sufficient to compress the spring thrust element between the flange and the first part until the piston assumes a locked position.

* * * * *